(12) United States Patent
Proebstle et al.

(10) Patent No.: US 7,489,113 B2
(45) Date of Patent: Feb. 10, 2009

(54) ENERGY STORAGE SYSTEM FOR A MOTOR VEHICLE

(75) Inventors: Hartmut Proebstle, Augsburg (DE); Thomas Christ, Auburn Hills, MI (US); Johannes von Grundherr, Munich (DE); Marcus Hafkemeyer, Munich (DE); Michael Roesler, Pullach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 201 days.

(21) Appl. No.: 11/655,139

(22) Filed: Jan. 19, 2007

(65) Prior Publication Data

US 2007/0170896 A1 Jul. 26, 2007

(30) Foreign Application Priority Data

Jan. 21, 2006 (DE) .................. 10 2006 002 985

(51) Int. Cl.
 *H02P 9/00* (2006.01)
 *H02P 11/00* (2006.01)
(52) U.S. Cl. .................. 322/17; 322/44; 322/37
(58) Field of Classification Search ............... 322/17, 322/24, 44, 37; 307/10.1
See application file for complete search history.

(56) References Cited

U.S. PATENT DOCUMENTS

| | | | |
|---|---|---|---|
| 6,624,618 B2* | 9/2003 | Kernahan et al. | 322/90 |
| 7,091,626 B2* | 8/2006 | Bluemel et al. | 290/40 C |
| 7,127,288 B2* | 10/2006 | Sturman et al. | 607/2 |
| 2001/0043055 A1* | 11/2001 | Tanaka et al. | 322/28 |
| 2004/0021448 A1* | 2/2004 | Bluemel et al. | 322/44 |
| 2004/0100241 A1* | 5/2004 | Abo | 323/284 |
| 2006/0108987 A1* | 5/2006 | Aoyama | 322/28 |
| 2007/0188151 A1* | 8/2007 | Yamaguchi | 322/24 |
| 2007/0194761 A1* | 8/2007 | Yamaguchi et al. | 322/28 |

FOREIGN PATENT DOCUMENTS

DE 100 46 631 A1 3/2002

* cited by examiner

*Primary Examiner*—Julio Gonzalez
(74) *Attorney, Agent, or Firm*—Crowell & Moring LLP

(57) ABSTRACT

An energy storage system for a motor vehicle is provided, including an electric machine, which can be operated at least as a generator, for generating a generator current; a vehicle electrical system battery, which is connected to the electric machine in parallel; a capacitor unit, which is connected to the electric machine in parallel; and a controller for controlling the electric machine. The controller is configured such that if the vehicle is in the boost or braking operating mode, the battery of the vehicle electrical system is charged with a maximum battery charging current, whereas in all other cases the battery of the vehicle electrical system is charged by a battery charging current that is adjusted as a function of the charge state of the battery of the vehicle electrical system. Therefore, in order to adjust the battery charging current as a function of the charge state of the battery of the vehicle electrical system, three different charge states are considered.

14 Claims, 2 Drawing Sheets

ENERGY STORAGE SYSTEM FOR A MOTOR VEHICLE

CROSS REFERENCE TO RELATED APPLICATIONS

This application claims priority under 35 U.S.C. §119 to German Patent Application No. 102006002985.2, filed Jan. 21, 2006, the entire disclosure of which is herein expressly incorporated by reference.

BACKGROUND AND SUMMARY OF THE INVENTION

The present invention relates to an energy storage system for a motor vehicle including an electric machine, which can be driven by an internal combustion engine and can be operated at least as a generator; a vehicle electrical system battery, which is connected to the electric machine in parallel; and a controller for actuating the electric machine such that a defined desired voltage of the generator is specified to the electric machine as a function of the presence or absence of a boost or braking operation.

German patent document DE 100 46 631 A1 discloses an energy storage system including a generator, a battery of the vehicle electrical system, as well as a controller with a generator regulator and generator control unit for specifying a desired generator voltage. The desired voltage is specified as a function of the driving condition variables such that, in the braking or boost operating mode of the vehicle, electric energy is fed into the vehicle electrical system. The method for regulating the generator voltage is carried out such that, depending on the specified changeover conditions, there is a changeover between a recuperation readiness mode and a recovery mode for the battery of the vehicle electrical system. For example, the charge throughput through the battery since the last changeover from the recovery mode into the recuperation readiness mode may be used as the changeover condition.

An object of the invention is to improve an energy storage system of the class described above. In particular, the invention shall provide an energy storage system, which is easy to construct and, with respect to the efficiency of energy accumulation, increases the energy gained by recuperation.

The invention is based on the knowledge that the recuperation capacity of known energy storage systems is limited by the capacity of a battery of the vehicle electrical system to consume high power. In the event that the state of charge is 70%, a conventional battery of the vehicle electrical system can consume a maximum current in the range of 50 A. A double layer capacitor, which may be used in the invention, can consume or provide current ranging up to 200 A. The present invention solves this problem.

According to the present invention, the energy storage system includes not only an electric machine for generating electric energy, a vehicle electrical system battery, which is connected to the electric machine in parallel, and a controller for controlling the electric machine via adjustment of the generator output voltage or rather the generator output current, but also a capacitor unit, which is connected in parallel to the electric machine and the battery of the vehicle electrical system. The controller is configured, according to the invention, such that in the event that the vehicle is in the boost or braking operating mode, the battery of the vehicle electrical system is charged with a maximum charging current (battery charging current/generator current). In all other cases, the battery of the vehicle electrical system is charged by a charge current that is adjusted as a function of the charge state of the battery of the vehicle electrical system. Beyond the boost and braking operating mode, a distinction is made among the following three cases.

In the event that the state of charge exceeds a pre-defined first charge threshold value, a targeted discharging of the battery of the vehicle electrical system is carried out by regulating the generator current such that the result is a pre-defined minimum battery charging current.

In the event that the state of charge falls below a pre-defined second charge threshold value, the battery of the vehicle electrical system is charged by regulating the generator current in such a way that the result is a pre-defined maximum battery charging current.

In the event that the state of charge is equivalent to the specified state of charge, the generator current is regulated to guarantee that no and/or the lowest possible (charging or discharging) current flows through the battery of the vehicle electrical system. The first charge threshold value may be different from the second charge threshold value. Therefore, for the third case the result is that the state of charge is equivalent to the specified state of charge, when the latter is between the two specified threshold values of the charge states. Outside the boost or braking operating mode, the battery of the vehicle electrical system may be charged by means of a pre-defined map.

In the case of a boost or braking operation, a changeover is made from the map control to an operating mode (generator operating mode), in which the electric machine charges the battery or rather the capacitor, connected to the battery in parallel, with a specified maximum current. In an exemplary embodiment of the invention, the controller is configured such that the vehicle speed is monitored, and if a specified driving speed is not reached, the capacitor is charged up to a pre-defined charge value.

In another exemplary embodiment of the invention, the controller is configured such that the vehicle speed is monitored, and if a specified driving speed is exceeded, or if a specified driving speed is exceeded for a specified period of time, the capacitor is discharged to a pre-defined charge value. Exceeding the speed implies a future braking operation within a defined period of time; and for this reason the capacitor is discharged as far as to a pre-defined value (and thereby reducing the load on the electric machine) in order to consume sufficient energy again during a forthcoming braking operation.

Furthermore, the controller may be configured such that, in the event that the motor vehicle is switched off in a detectable manner (e.g., ignition OFF and/or the vehicle locked and/or the driver's seat or rather the seat is not occupied), the capacitor unit is separated electrically from the vehicle electrical system.

Other objects, advantages and novel features of the present invention will become apparent from the following detailed description of the invention when considered in conjunction with the accompanying drawings.

DETAILED DESCRIPTION OF THE DRAWINGS

Figure 1:
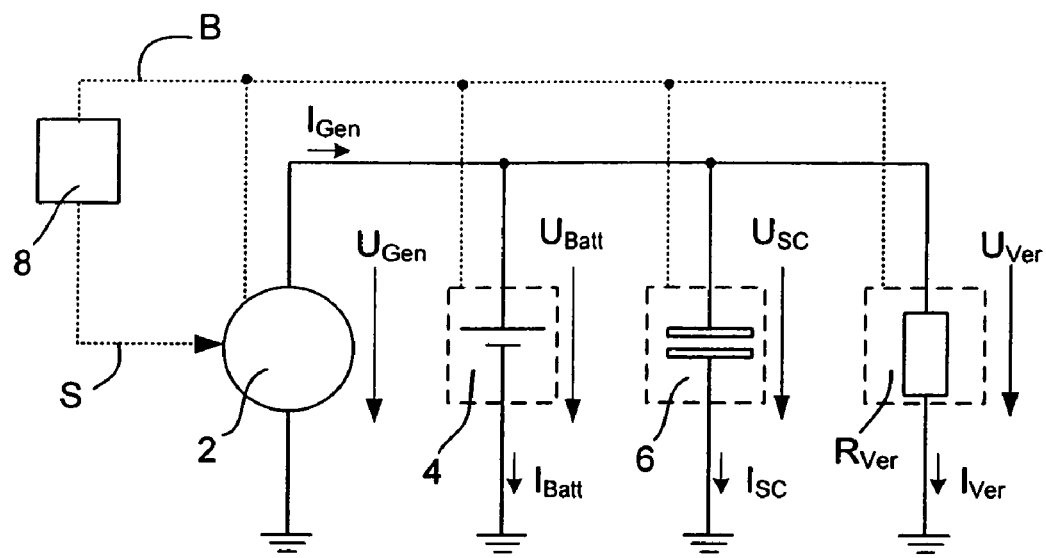
FIG. 1 is a schematic drawing of the configuration of an energy storage system, according to the invention.

FIG. 1 depicts the configuration of an energy storage system for feeding the electrical system of a motor vehicle, according to the present invention. The energy storage system includes an electric machine 2 (referred to below as the generator), which can be operated at least as a generator; a vehicle electrical system battery 4, which is connected in parallel to the output of the generator 2; a capacitor unit 6, which may be constructed as a double layer capacitor or a supercap; and a controller 8 for controlling or regulating the generator current $I_{Gen}$, or the battery current (battery charging current or battery discharging current) $I_{Batt}$. The electric consumers of the motor vehicle are depicted by the load resistor $R_{Ver}$. The controller 8 is connected to the generator 2, the vehicle electrical system battery 4, the capacitor unit 6 and the consumers $R_{Ver}$ of the vehicle electrical system by the databus B for the exchange of data and/or for the purpose of recording data. On the output side, the controller 8 is connected to the generator by at least one control line S to control and/or regulate the generator 2.

Figure 2:
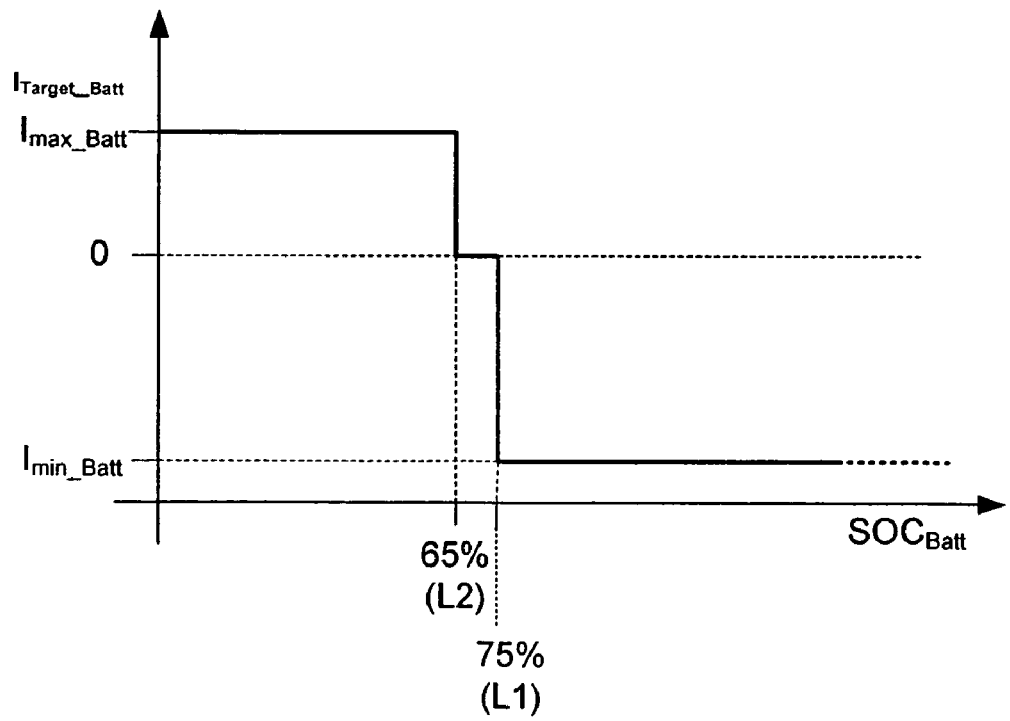
FIG. 2 depicts the course of a characteristic curve for controlling and/or regulating the electric machine outside the boost or braking operation of the vehicle.

FIG. 2 illustrates in a simple way how the controller 8 works (at least in the absence of a boost or braking operation). For the case that there is no boost or braking operation, the controller 8 controls (or regulates) the generator 2 as a function of the state of charge ($SOC_{Batt}$) of the battery 4 of the vehicle electrical system. Therefore, a distinction must be made among three operating states (cases) of the battery 4 of the vehicle electrical system.

In a first operating state, in which the state of charge of the battery 4 of the vehicle electrical system is above a first charge state threshold value L1 (for example, SOC>L1 (75%)), the generator voltage $U_{Gen}$ or rather the generator current $I_{Gen}$ is adjusted in such a way that the result is a specified (negative) minimum battery charging current $I_{min\_Batt}$. In this way, the battery 4 of the vehicle electrical system takes over, at least to some degree, the supply of electric energy to the vehicle electrical system, thus reducing the load on the generator 2 and, consequently, on the internal combustion engine driving the generator 2. The result is a reduction in the fuel consumption.

In a second operating state, in which the state of charge of the battery 4 of the vehicle electrical system is below a second charge state threshold value L2 (for example, SOC<L2 (65%)), the generator current $I_{Gen}$ is adjusted or rather regulated to a generator voltage $U_{Gen}$ or rather to a generator current $I_{max\_Gen}$ so that the result is a pre-defined maximum battery charging current $I_{max\_Batt}$. The battery of the vehicle electrical system and thus the capacitor unit 6, connected to the battery in parallel, are supplied with the maximum amount of energy.

Since the capacitor 6 is connected in parallel, without the interconnection of an additional DC/DC converter, during short braking phases, during which the generator 2 can generate a significantly higher current than can be processed by the battery 4 of the vehicle electrical system, the higher currents can also be converted into storable energy. Thus, the generator voltage is raised by choice, and the capacitor 6 is loaded with a significantly raised charging current. The raised generator current $I_{Gen}$ is divided into a battery charging current $I_{Batt}$, a capacitor charging current $I_{SC}$ and one or more consumer supply currents $I_{Ver}$. The charge state of the capacitor 6 may be monitored, and if desired, as soon as the capacitor 6 is completely or almost completely charged, the generator current $I_{Gen}$ is decreased again so that the battery 4 of the vehicle electrical system is not damaged by a charging current that is too high. In a third operating state, in which the charge state of the battery 4 of the vehicle electrical system is between the first and the second charge state threshold values L1 and L2 (for example, L1 (75%)>SOC>L2 (65%)), a generator current $I_{Gen}$ is readjusted. The generator current guarantees that the battery charging current or the battery discharging current $I_{Batt}$ is adjusted to a specified minimum current value.

Figure 3:
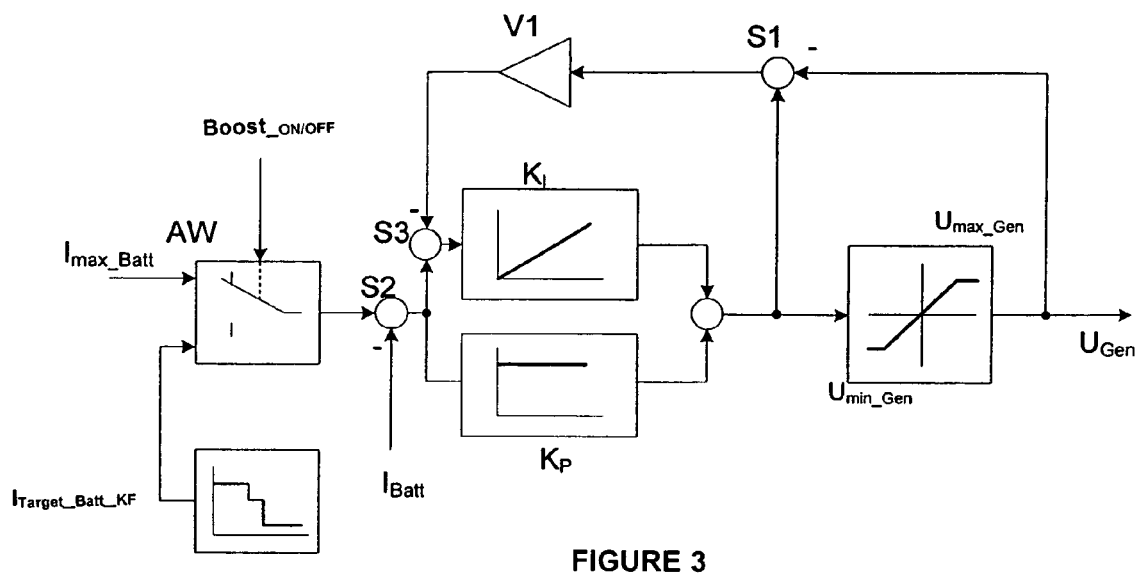
FIG. 3 is a schematic drawing of the design of a regulator for actuating the electric machine.

FIG. 3 shows the structure of a potential generator control for adjusting the generator output voltage $U_{Gen}$ as a function of the state of charge ($SOC_{Batt}$) of the battery 4 of the vehicle electrical system and/or as a function of the presence or absence of a boost or braking operation. In this case, there may be a regulator with a proportional and integral action control element, a so-called PI action control unit or PI-controller. Connected downstream of the PI-controller is a limiting element, which limits the output signal of the PI-controller to the upper or lower limit values. Input and output of the limiting element are fed again to the PI-controller on the input side by a first summation element S1 and an amplifier V1. Furthermore, on the input side the battery current $I_{Batt}$ is fed with the output of a selector AW to the PI-controller by a second summation element S2 (together with the output of the amplifier V1 by another summation element S3). The selector AW switches through one of two inputs of the selector AW to the output as a function of the output signal boost\_ $_{ON/OFF}$ of a boost and braking monitoring unit. If there is a braking or boost operation, the selector AW switches the input with constantly specified maximum battery current $I_{max\_Batt}$ to the output, as illustrated. If there is no boost or braking operation, the changeover is made to the second input, which is wired to a pre-defined characteristic and/or a pre-defined map, so that a desired input $I_{Target\_Batt\_KF}$ for the generator 2 is switched through to the output of the selector AW as a function of the charge state of the battery 4 of the vehicle electrical system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage system for a motor vehicle, comprising:
    an electric machine configured for operation at least as a generator, for generating a generator current;
    a vehicle electrical system battery connected in parallel to the electric machine;
    a capacitor unit connected in parallel to the electric machine; and
    a controller configured such that the battery is charged with a maximum battery charging current, if the vehicle is in a boost or braking operating mode, and in all other operating modes, the battery is charged by a battery charging current that is adjusted as a function of a state of charge of the battery, wherein
        the controller is configured to adjust discharging of the battery such that a pre-defined minimum battery charging current flows through the battery, if the state of charge of the battery exceeds a pre-defined first charge threshold value;
        the controller is configured to adjust charging of the battery such that a pre-defined maximum battery charging current flows through the battery, if the state of charge of the battery falls below a pre-defined second charge threshold value; and the controller is configured to regulate the generator current such that a predetermined minimum charging current flows through the battery, if the state of charge of the battery is equivalent to a predetermined state of charge.

2. The energy storage system, as claimed in claim 1, wherein the controller is configured such that, if a specified lower driving speed threshold value is not reached, the capacitor unit is charged up to a pre-defined charging value.

3. The energy storage system, as claimed in claim 1, wherein the controller is configured such that, if a specified driving speed threshold is exceeded or if a specified driving speed threshold is exceeded for a specified period of time, the capacitor unit is discharged to a pre-defined charge value.

4. The energy storage system, as claimed in claim 1, wherein the controller is configured such that, if the motor vehicle is switched off in a detectable manner, the capacitor unit is separated electrically from the vehicle electrical system.

5. The energy storage system, as claimed in claim 2, wherein the controller is configured such that, if a specified driving speed threshold is exceeded or if a specified driving speed threshold is exceeded for a specified period of time, the capacitor unit is discharged to a pre-defined charge value.

6. The energy storage system, as claimed in claim 2, wherein the controller is configured such that, if the motor vehicle is switched off in a detectable manner, the capacitor unit is separated electrically from the vehicle electrical system.

7. The energy storage system, as claimed in claim 3, wherein the controller is configured such that, if the motor vehicle is switched off in a detectable manner, the capacitor unit is separated electrically from the vehicle electrical system.

8. A method for controlling an energy storage system of a motor vehicle, comprising:
   operating an electric machine, which is connected in parallel with a vehicle electrical system battery and a capacitor unit, at least as a generator for generating a generator current;
   charging the battery with a maximum battery charging current, if the vehicle is in a boost or braking operating mode;
   charging the battery with a battery charging current that is adjusted as a function of a state of charge of the battery, if the vehicle is in an operating mode other than the boost or braking operating mode;
   adjusting discharging of the battery such that a pre-defined minimum battery charging current flows through the battery, if a state of charge of the battery exceeds a pre-defined first charge threshold value;
   adjusting charging of the battery such that a pre-defined maximum battery charging current flows through the battery, if the state of charge of the battery falls below a pre-defined second charge threshold value; and
   regulating the generator current such that a predetermined minimum charging current flows through the battery, if the state of charge of the battery is equivalent to a predetermined state of charge.

9. The method of claim 8, wherein the capacitor unit is charged up to a pre-defined charging value, if a specified lower driving speed threshold value is not reached.

10. The method of claim 8, wherein the capacitor unit is discharged to a pre-defined charge value, if a specified driving speed threshold is exceeded or if a specified driving speed threshold is exceeded for a specified period of time.

11. The method of claim 8, wherein the capacitor unit is separated electrically from the vehicle electrical system, if the motor vehicle is switched off in a detectable manner.

12. The method of claim 9, wherein the capacitor unit is discharged to a pre-defined charge value, if a specified driving speed threshold is exceeded or if a specified driving speed threshold is exceeded for a specified period of time.

13. The method of claim 9, wherein the capacitor unit is separated electrically from the vehicle electrical system, if the motor vehicle is switched off in a detectable manner.

14. The method of claim 10, wherein the capacitor unit is separated electrically from the vehicle electrical system, if the motor vehicle is switched off in a detectable manner.

* * * * *